UNITED STATES PATENT OFFICE.

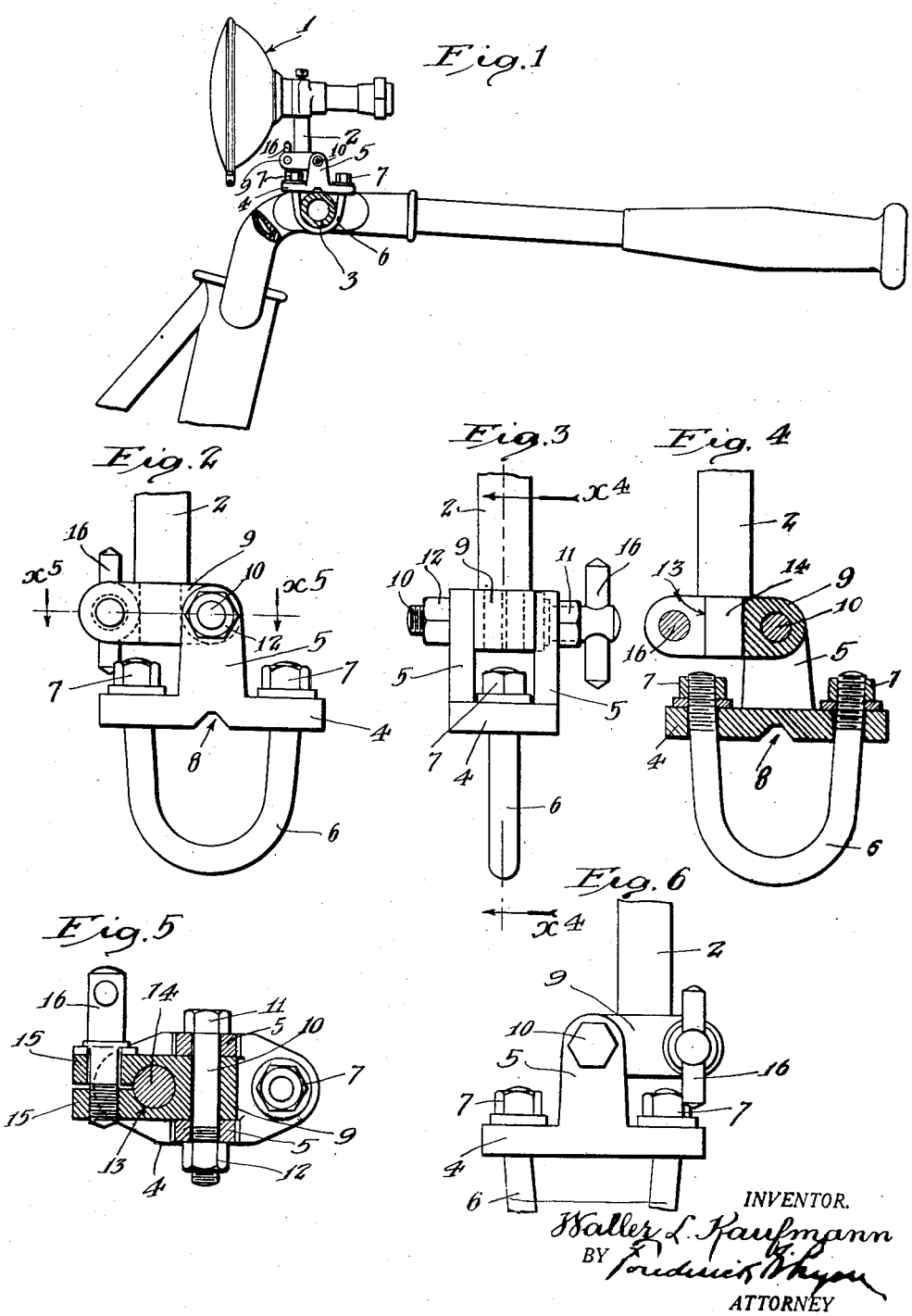

WALLER L. KAUFMANN, OF SANTA ANA, CALIFORNIA.

MOUNTING FOR SPOTLIGHTS.

1,381,313.   Specification of Letters Patent.   Patented June 14, 1921.

Application filed July 26, 1920. Serial No. 399,133.

*To all whom it may concern:*

Be it known that I, WALLER L. KAUFMANN, a citizen of the United States, residing at Santa Ana, in the county of Orange and State of California, have invented a new and useful Mounting for Spotlights, of which the following is a specification.

My invention relates to mountings for spotlights, and particularly to means for mounting spotlights upon motorcycle bars.

An object of my invention is to provide a sturdy and reliable mounting for spotlights upon motorcycle bars, which will be simple of construction and economical in manufacture.

Another object of my invention is to provide a mounting of the character mentioned, which will readily effect horizontal and vertical adjustment of a spotlight mounted thereby.

A further object of my invention is to provide a mounting of the character mentioned which may be readily and easily attached to or detached from a motorcycle bar.

Other objects and advantages will appear from the subjoined detailed description, wherein I have set forth a preferred embodiment of my invention.

In the accompanying drawings:

Figure 1 is a side elevation illustrating the mounting of a spotlight upon a motorcycle bar by means of my invention.

Fig. 2 is a side elevation of the preferred form of my invention.

Fig. 3 is an end elevation of the device illustrated in Fig. 2.

Fig. 4 is a vertical section take on a line indicated by $x^4$—$x^4$ in Fig. 3.

Fig. 5 is a horizontal section taken on a line indicated by $x^5$—$x^5$ in Fig. 2.

Fig. 6 is a fragmentary side elevation illustrating the arm of the preferred form of my invention in reversed position.

Referring to the drawings, 1 indicates a spotlight of the type provided with a depending post 2. By means of a preferred embodiment of my invention the spotlight 1 is mounted upon the transverse or cross bar 3 of a motorcycle. The remainder of the motorcycle is fragmentarily indicated in Fig. 1. By means of my invention spotlights may be mounted on vehicles other than motorcycles. For illustrative purposes only I have shown my invention as applied to motorcycles, to which it is particularly adaptable. The bar 3 may be a suitable corresponding part of any vehicle.

The embodiment of my invention illustrated in the drawings, includes a bracket comprising a base 4 provided with a standard formed by opposed medial ears 5. This bracket is secured to the bar 3 by means of a clevis 6, the ends of which project through apertures in the base 4. This connection may be tightened as desired by means of the nuts 7. I find that it adds to the rigidity of this connection to provide a notch 8 in the underside of the base 4.

An arm 9 is vertically pivoted at one end intermediate the ears 5 by means of a stud or bolt 10. The stud 10 is readily limited against displacement by means of the bolt head 11 and nut 12.

The arm 9 is apertured at 13 to pivotally receive the trunnion 14 formed at the lower end of the post 2. The free end of the arm 9 is split to provide opposed limbs 15. The limbs 15 are contracted by means of a wing nut 16 to functionally clamp the trunnion 14 within the aperture 13.

In operation my invention provides a mounting which may be readily and simply assembled and easily positioned. When in position the pivoted arm 9 effects a vertical adjustment of the spotlight 1. This spotlight may be horizontally adjusted by turning the same through its post 2 within the aperture 13. The wing nut 16 and the nut 12 are readily adjusted to provide sufficient tension upon the trunnion 14 and stud 10 respectively to prevent vibrations or jars from disarranging either the vertical or horizontal adjustment of the spotlight 1, and yet allow convenient and facile horizontal or vertical adjustment thereof as desired.

To conform to the provisions of acts regulating the mounting of spotlights and to prevent the manipulation of the spotlight so as to blind an approaching pedestrian or driver of an approaching vehicle, the arm 9 may be reversed on the stud 10 as illustrated in Fig. 6. When reversed the arm 9 will contact with the bolt 7 if the spotlight be swung vertically to project the rays forward above a certain height. There is no limitation however to the vertical adjustment of the spotlight when the same is swung horizontally so that the rays thereof are not projected directly forward of the vehicle.

My invention is not limited to the details of construction included within my preferred embodiment thereof, and is of the scope and breadth set forth in the following claims.

I claim:

1. A mounting for spotlights comprising a horizontal base, means to secure the base to a support, an arm horizontally pivoted on the base to swing vertically and normally extended laterally and forwardly, a spotlight vertically journaled in the arm to swing horizontally, means frictionally clamping the spotlight on the arm in adjusted position, and means frictionally clamping the arm on the base in adjusted position, the arm being reversible to extend laterally and rearwardly and the base being extended rearwardly to limit the upward tilting of the spotlight when the arm is in reversed position.

2. A mounting for spotlights comprising a horizontal base, means to secure the base to a support, an arm horizontally pivoted on the base to swing vertically and normally extended laterally and forwardly, a spotlight vertically journaled in the arm to swing horizontally, means frictionally clamping the spotlight on the arm in adjusted position, and means frictionally clamping the arm on the base in adjusted position, the arm being reversible to extend laterally and rearwardly and the securing means extending into the path of movement of the arm to limit the upward tilting of the spotlight when the arm is in reversed position.

3. A mounting for spotlights comprising a base, means securing the base to a support, the base having opposed upwardly extended ears, an arm horizontally pivoted to and between said ears and normally extending laterally and forwardly, said arm being vertically apertured to receive the post of a spotlight and split to form opposed limbs, means to draw the opposed limbs together to frictionally clamp the post, and means to draw the opposed ears together to frictionally clamp the arm, the arm being adapted to be swung to extend laterally and rearwardly to receive the post in the opposite end of the aperture and the base being extended rearwardly to limit the downward swing of the arm when in reversed position.

Signed at Santa Ana, California, this 10th day of July 1920.

WALLER L. KAUFMANN.

Witnesses:
CARL H. KAUFMANN,
WILLIAM R. HOWELL.